United States Patent [19]

Sahmel

[11] 3,748,907

[45] July 31, 1973

[54] FLUID SAMPLING DEVICE

[75] Inventor: Otto H. Sahmel, Rochester, N.Y.

[73] Assignee: Bausch & Lamb Incorporated, Rochester, N.Y.

[22] Filed: June 7, 1971

[21] Appl. No.: 150,320

[52] U.S. Cl. .................................. 73/423 A
[51] Int. Cl. ............................... G01n 1/14
[58] Field of Search ............... 73/423 A; 23/253 R, 23/259, 292

[56] References Cited
UNITED STATES PATENTS

| 3,192,968 | 7/1965 | Baruch et al. | 73/423 A |
| 3,301,065 | 1/1967 | Fahrenbach | 73/423 A |
| 3,376,751 | 4/1968 | Junger | 73/423 A |

Primary Examiner—S. Clement Swisher
Attorney—Frank C. Parker and John E. Leonarz

[57] ABSTRACT

In automatic analysis apparatus having a feed mechanism which periodically presents a test tube at a fixed station to have its contents drawn into the apparatus for analysis, a rotating crank drives a pivoting arm in an arcuate path, the arm being connected to a flexible probe which thereby is alternately pushed into and withdrawn from each succeeding test tube. A guide member may be supplied on a second pivoting arm to assist the probe's entry into the test tube. The interface between crank and arm may be provided with any of a variety of dwell cams to adjust the time during which the probe is in the test tube for withdrawal of the sample, or to adjust the time during which the probe is above the test tube station for movement of the tube conveyor or for cleaning of the probe.

4 Claims, 2 Drawing Figures

FLUID SAMPLING DEVICE

BACKGROUND OF THE INVENTION

1. Field of the Invention

This invention lies in the field of sample supply for automatic spectroanalysis equipment, and more specifically in the field of improved mechanism for introduction and withdrawal of flexible probes in test tubes automatically presented to a sampling station.

2. Description of the Prior Art

The requirements of a sampling probe in automatic analysis equipment are that it be insertible into a test tube and retractible, that it remain in the tube long enough to withdraw an adequate sample and stay up long enough for the next tube to come to the testing position, that it should not contribute to error in the analysis, and that it should be inexpensive, reliable, simple and safe. None of the known sampling apparatus appear to fully satisfy all of the criteria.

SUMMARY OF THE INVENTION

The invention is a simple mechanism for drawing a liquid sample from a test tube. The environment in which it is to work includes automatic analysis equipment, for instance a spectrophotometer. Such devices are often furnished with vacuum-forming means which draw samples along a flexible tube and through a flow cell for spectroanalysis.

Electric motors coupled to an assortment of linkages are often employed to shift racks of test tubes along a fixed path close by the instrument to automate the process of supplying samples in such devices. Typically a rack will have a plurality of evenly spaced test tubes and the advancing mechanism will deliver them in step-by-step increments past a predetermined sampling station.

My invention comprises a simplified mechanism for introducing a flexible probe into a test tube at such a sampling station and subsequently withdrawing it. Employing an electric motor's rotational movement as a power source, I turn a crank to drive a lever back and forth. The lever is attached at its outer end to the flexible probe which is thereby drawn forward or pushed back regularly with each rotation of the crank, in an arcuate motion. The electric motor may be the same one used to power the movement of test tubes in the system.

Conventional apparatus forming no part of the present invention, are employed to present a plurality of sample containers, as for instance test tubes, regularly and one at a time, to a sampling station. The lever and crank are carefully located so that the forward portion of the lever's arcuate excursion is spatially fixed in relation to the sampling station. A guide member may be used to further assist the flexible probe in entering the neck of the sample receptable.

In order to assure that a generous sample will be taken and that no significant portion of the sample might be lost by settling below the sampling level, it is often desirable that the probe be driven to the bottom of the test tube and that it remain there for a longer period than might be contemplated by the peaking of the simple harmonic action induced by the turning crank. Accordingly, in a version of my invention one of a variety of dwell cams may be employed to prolong the probe's sojourn at the bottom of the test tube.

It may also be desirable to have the probe linger in the up position as, for instance, where it is desirable to allow a distinct time period to elapse for the test tube advancing mechanism to complete its shifting cycle before permitting the probe to be lowered once again into the next tube, and similar dwell-inducing means may be employed to bring about that end.

DESCRIPTION OF THE PREFERRED EMBODIMENT

Figure 1:
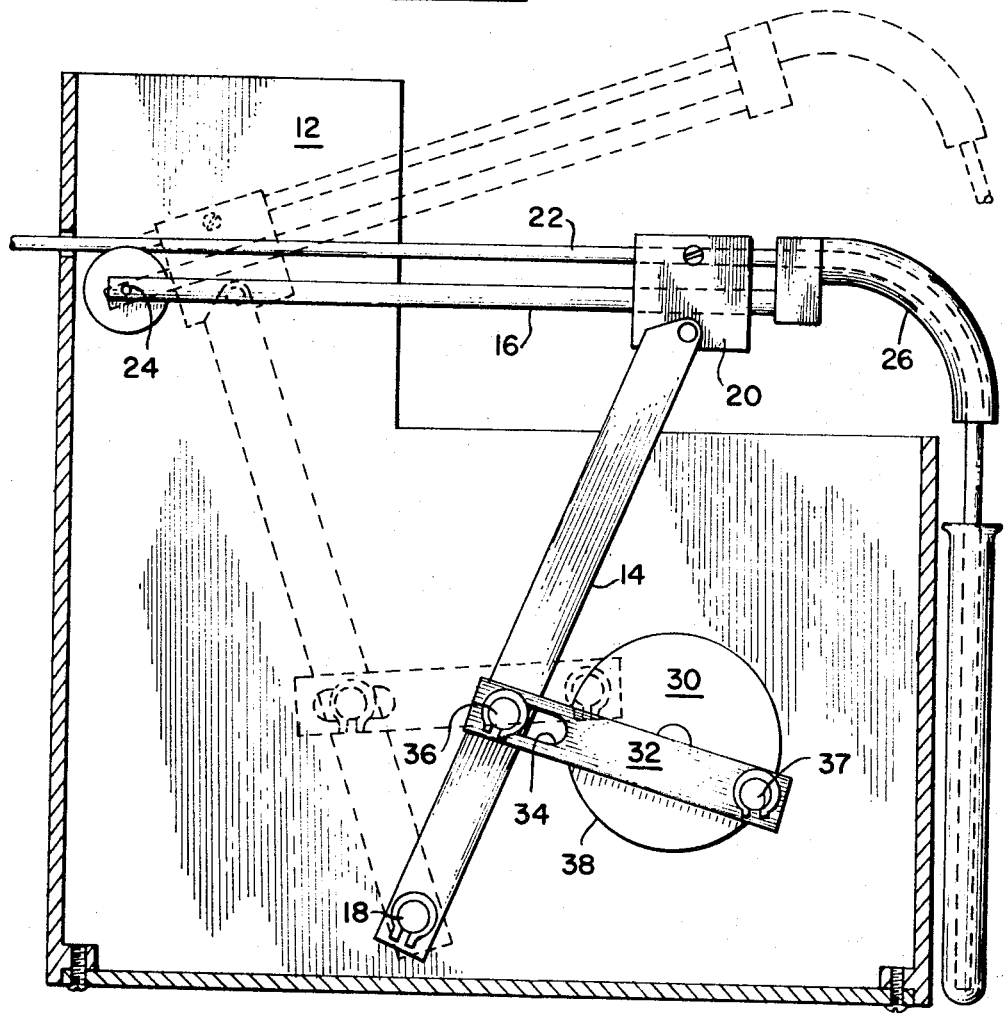

A chassis or base 12 is provided upon which two arms 14 and 16 are mounted. The arm 14 is adapted to pivot at one end about a point 18 whose mechanical representation may be a rivet or, as shown, a stud with a cooperative retainer. At its other end, the arm 14 is connected to a member 20 which is slidably connected to slide along the arm 16. The slide member 20 includes a clamp which secures a flexible tubular probe 22 to the slide.

The arm 16 is pivotally mounted in a manner similar to that of the arm 14 on the base 12 at a point 24. At its end opposite the pivot, the arm 16 carries a guide member 26 whose function is to direct the probe into a sample-carrying test tube.

A crank member such as the wheel 30 is driven by suitable means such as an electric motor, not shown, so as to impart a reciprocating arcuate action to the arm 14. In one successful version of the sampler mechanism of my invention the crank 30 is interfaced with the arm 14 by means of the link 32. A slot 34 is formed in one end of the link 32 and a stud 36 on the arm 14 protrudes through the slot and is there retained by suitable means, such as a retainer clip, the link 32 being driven by means of a stud 37 on the crank 30.

In operation, the crank 30 is turned continuously at a substantially constant rate of speed, its outward end describing a circle 38. The link 32 presses against the stud 36 and pivots the arm 14 about the pivot point 18, thereby drawing the slide member 20 back and forth along the arm 16. Since the arm 14 operates in a substantially vertical plane and since the arc through which it travels rises and falls, the arm 16 which is also pivotally mounted, rises and falls with the outer end of the arm 14. The probe 22, being firmly held by the slide member 20 is retracted as the slide 20 is moved toward the pivot 24. Because the arm 16 is being raised while the slide 20 is moving toward the pivot 24, the probe 22 is additionally pulled away from the test tube 28 while the arm 14 and the slide 20 are being pushed in that direction. When the guide member 26 and the probe 22 are up and out of the way, automatic mechanism, not shown, moves another test tube to the sampling station.

As the crank 30 continues its rotation, the link 32 is drawn forward, and after the period of time has passed during which the slot 34 is drawn past the stud 36, the arm 14 is drawn forward, pulling with it the slide member 20 and the probe 22. While traveling through this portion of its arc, the arm 14 serves to lower the arm 16 with the guide member 26 attached to the arm 16 on its outboard end. The probe 22 is thereby aimed at the opening of the next test tube, and when the slide member has been pushed to the end of its excursion, the probe 22 will have reached the bottom of the test tube 28. It may be noticed that the slot 34 in the link 32 serves to leave the mechanism including the arms 14 and 16, the slide 20, the probe 22 and the guide member 26 at a rest position both at the lower and upper portions of its excursions, thereby permitting the probe to dwell in the bottom of the test tube for drawing a generous sample, and also to pause in the upper position for the purpose of allowing the test tube advancing mechanism to carry out its cycle.

Figure 2:
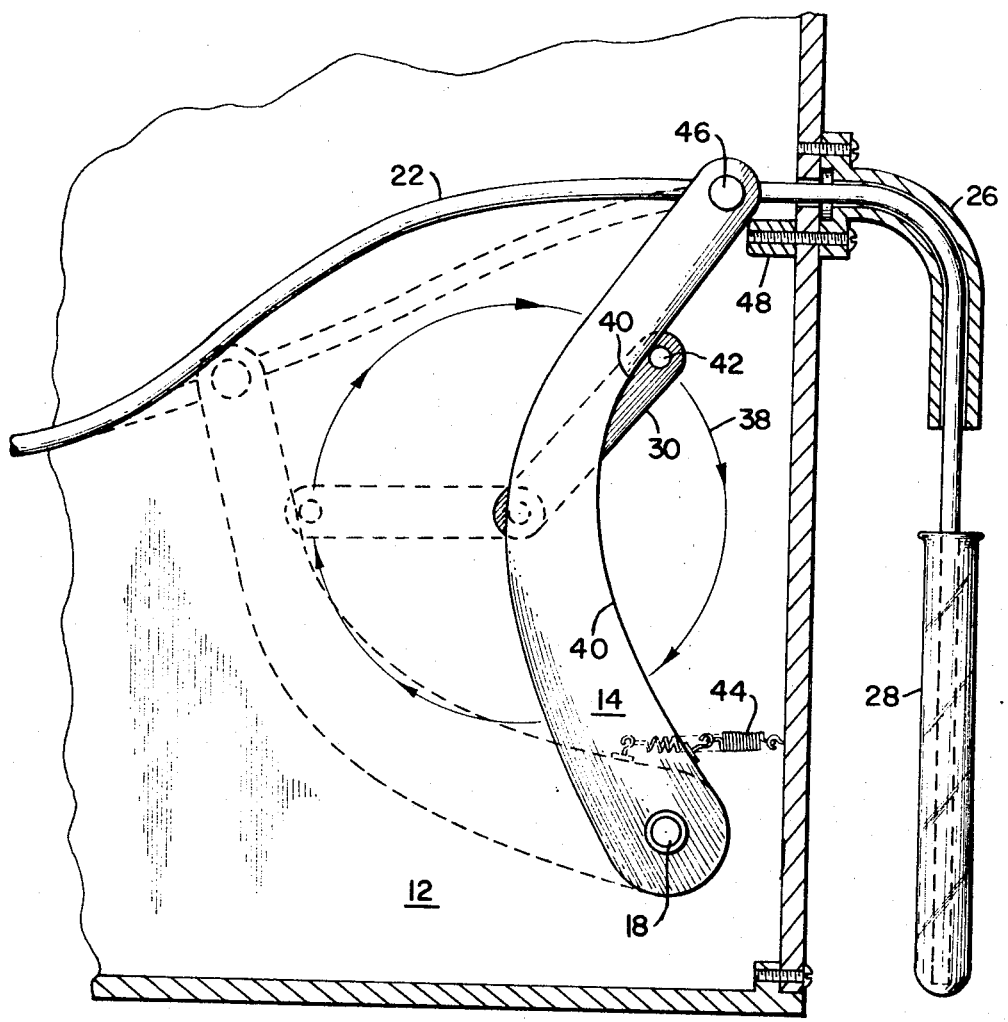

In FIG. 2 is shown a second version of my sampler mechanism wherein members whose purposes closely correspond to those of members appearing in the embodiment of FIG. 1 are similarly numbered.

An arm 14 is pivotally mounted upon a base 12 at a pivot point 18. The arm 14 is shaped somewhat like a banana, notably in defining a concave arc portion 40 which forms a bearing surface adapted to receive the stud 42 during a portion of its cycle through the circle of movement 38 occasioned by rotation of the crank 30. The arm 14 is urged against the stud 42 by the spring 44 so that the position of the arm 14 and of things connected to it will be a function of the rotational position of the crank 30.

At its outboard end the arm 14 carries a probe retainer 46 extending through the arm 14 and having an aperture of the same diameter as that of the probe 22, to secure the same and hold it during reciprocations of the arm 14. A stop member 48 may be provided to interrupt forward motion of the arm 14 at a predetermined position corresponding to the probe 22 having reached the bottom of a test tube 28.

Unlike the version of FIG. 1, the present embodiment employs a fixed guide member 26 which is rigidly attached by suitable means to the base 12 in a manner calculated to define a sampling station therebelow at which the test tube advancing means periodically presents a test tube 28.

It may now be observed that in operation the crank 30 will be continously and cyclically rotated by a suitable power source, as an electric motor not shown, to drive the stud 42 at a substantially constant speed through a clockwise circular path 38 during the course of which it will cyclically and sequentially: (1) deposit the arm 14 against the stop member 48 for a predetermined angle of rotation during which the probe 22 dwells at the bottom of test tube 28; (2) meet the concave arc portion of the arm 14 and drive the arm 14 back to the position shown in dotted outline in FIG. 2, thereby causing the probe 22 to be drawn up within the guide 26 and clear of the upper rim of the test tube 28 to permit positioning of a new test tube; (3) travel through a portion of arc corresponding to the concave arcuate portion 40 of the arm 14, such portion of travel yielding very little motion of the arm 14 by virture of its shape corresponding to that of the circle 38 during this phase of the cycle and thus providing a dwell period during which the new test tube may be positioned; and (4) rotating forward to complete the cycle by permitting the arm 14 to be drawn forward by the spring 44, pulling the probe 22 forward through the guide 26 and down into the test tube 28, until further forward motion of the arm 14 is arrested by contact once again with the stop member 48.

I claim:

1. In chemical analysis equipment, improved sampling mechanism including a flexible sampling probe, comprising:
   a. a base;
   b. a first arm pivotally mounted upon said base;
   c. a slide member constrained for sliding movement along said first arm, said side member having means for holding said flexible probe;
   d. a second arm pivotally connected to said base and being further pivotally connected to said slide member;
   e. crank means drivably connected to said second arm for reciprocating said second arm around its base pivot through a limited arc;
   said second arm driving said slide along said first arm for raising and lowering said first arm, and also for impelling said flexible probe through a guide member on said first arm into and out of sample container means.

2. A control for a flexible probe in an automatic sampling apparatus having a fixed station to which successive fluid receptacles are presented, comprising:
   a. a base;
   b. a power source connected to the base;
   c. crank means drivably connected to the power source;
   d. an arm pivotally connected to the base and drivably connected to the crank means, the arm being constrained to describe an arcuate excursion when activated by the crank means;
   e. a probe connected to the arm at an outward portion thereof; and
   f. a second arm pivotally connected to the base and mounting the guide member at an end opposite the pivotal connection of the second arm to the base, the second arm slidably connected to the first arm and rising and falling as a function of the position of the first arm.

3. The control of claim 2 further comprising a dwell cam connecting the crank means and the arm; a guide member disposed proximate to the fixed station and to an end of the excursion of the arm.

4. In chemical analysis equipment, an improved sampling mechanism including a flexible sampling probe comprising:
   a. a base;
   b. a power source connected to the base;
   c. crank means drivably connected to the power source;
   d. an arm pivotally connected to the base and drivably to the crank means, the arm being constrained to describe an arcuate excursion when activated by the crank means and having a terminal end;
   e. a fixed, arced guide means;
   f. the probe connected proximate the terminal end of the arm and having a portion circumscribed by the guide means, the connection of the probe and arm spaced from and outside the area defined by the guide means; and
   g. the probe movable through the guide means and in and out of a succession of presented fluid receptacles.

* * * * *